US009075488B2

(12) United States Patent
Shepelev (10) Patent No.: US 9,075,488 B2
(45) Date of Patent: Jul. 7, 2015

(54) VIRTUAL GEOMETRIES FOR INTEGRATED DISPLAY AND SENSING DEVICES (71) Applicant: Synaptics Incorporated, Santa Clara, CA (US)

(72) Inventor: Petr Shepelev, San Jose, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 169 days.

(21) Appl. No.: 13/662,377

(22) Filed: Oct. 26, 2012

(65) Prior Publication Data
US 2013/0176276 A1 Jul. 11, 2013

Related U.S. Application Data (60) Provisional application No. 61/555,454, filed on Nov. 3, 2011.

(51) Int. Cl.
G06F 3/041 (2006.01)
G06F 3/044 (2006.01)

(52) U.S. Cl.
CPC .............. *G06F 3/044* (2013.01); *G06F 3/0412* (2013.01); *G06F 3/0416* (2013.01)

(58) Field of Classification Search
CPC ..... G06F 3/041; G06F 3/0412; G06F 3/0488; G06F 3/044; G06F 3/045; G06F 2203/04111
See application file for complete search history.

(56) References Cited

U.S. PATENT DOCUMENTS

| | | | |
|---|---|---|---|
| 5,534,892 A | 7/1996 | Tagawa | |
| 5,896,120 A | 4/1999 | Iguchi et al. | |
| 6,239,788 B1 | 5/2001 | Nohno et al. | |
| 6,825,833 B2 * | 11/2004 | Mulligan et al. | 345/174 |
| 2004/0217945 A1 | 11/2004 | Miyamoto et al. | |
| 2006/0012575 A1 | 1/2006 | Knapp et al. | |
| 2007/0074914 A1 * | 4/2007 | Geaghan et al. | 178/18.06 |
| 2008/0062139 A1 | 3/2008 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2010/0001973 A1 | 1/2010 | Hotelling et al. | |
| 2010/0193257 A1 | 8/2010 | Hotelling et al. | |
| 2010/0194695 A1 | 8/2010 | Hotelling et al. | |
| 2010/0194696 A1 | 8/2010 | Chang et al. | |
| 2010/0194697 A1 | 8/2010 | Hotelling et al. | |
| 2010/0194698 A1 * | 8/2010 | Hotelling et al. | 345/173 |
| 2011/0018557 A1 | 1/2011 | Badaye | |

(Continued)

*Primary Examiner* — Yong H Sim
(74) *Attorney, Agent, or Firm* — Patterson + Sheridan, LLP (57) ABSTRACT

Embodiments of the present invention generally provide a processing system for a display device integrated with a capacitive sensing device. The processing system includes a driver module including driving circuitry. The driver module is coupled to a plurality of common electrodes configured to be driven for display updating and capacitive sensing. A first transmitter electrode includes a first set of common electrodes of the plurality of common electrodes. A second transmitter electrode includes a second set of common electrodes of the plurality of common electrodes. A first common electrode of the second transmitter electrode is interleaved between a first pair of common electrodes of the first transmitter electrode. The processing system further includes a receiver module coupled to a plurality of receiver electrodes and configured for receiving resulting signals with the receiver electrodes and a determination module configured for determining positional information based on the resulting signals.

20 Claims, 7 Drawing Sheets

(56) References Cited

U.S. PATENT DOCUMENTS

| | | |
|---|---|---|
| 2011/0050585 A1 | 3/2011 | Hotelling et al. |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0267305 A1 | 11/2011 | Shahparnia et al. |

* cited by examiner

VIRTUAL GEOMETRIES FOR INTEGRATED DISPLAY AND SENSING DEVICES

CROSS-REFERENCE TO RELATED APPLICATIONS

This application claims benefit of U.S. Provisional Patent Application Ser. No. 61/555,454, filed Nov. 3, 2011, which is herein incorporated by reference in its entirety.

BACKGROUND OF THE INVENTION

1. Field of the Invention

Embodiments of the present invention generally relate to a system and method of sensing an input object's position over a sensing region of a proximity sensing device.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

A proximity sensor device may be integrated with a display device such that one or more types of electrodes are configured for both updating the display and transmitting input sensing signals. In such configurations, time must be divided between performing input sensing and updating display images with the shared electrodes (also called "common" electrodes).

Interference mitigation techniques used to ensure accurate input sensing typically require a minimum number of samples to be acquired per input sensing element for each input sensing cycle. However, because, in general, the time allocated to display updating cannot be changed, the non-display time periods available for performing input sensing cannot be significantly increased. Thus, in conventional configurations, there is a tradeoff between the number of samples acquired for each input sensing element and the resolution at which input sensing is performed—in order to increase the number of samples acquired per element per input sensing cycle, the number of sensing elements scanned during a given input sensing cycle must be decreased. Further, to decrease the number of input sensing elements, the size of each element must be increased, resulting in diminished spatial resolution and sensing accuracy.

Therefore, there is a need for increasing sensing performance without decreasing the resolution at which input sensing is performed.

SUMMARY OF THE INVENTION

Embodiments of the present invention generally provide a processing system for a display device integrated with a capacitive sensing device. The processing system includes a driver module having driving circuitry. The driver module is coupled to a plurality of common electrodes configured to be driven for display updating and capacitive sensing. A first transmitter electrode includes a first set of common electrodes of the plurality of common electrodes. A second transmitter electrode includes a second set of common electrodes of the plurality of common electrodes. A first common electrode of the second transmitter electrode is interleaved between a first pair of common electrodes of the first transmitter electrode. The processing system further includes a receiver module coupled to a plurality of receiver electrodes and configured for receiving first resulting signals with the receiver electrodes when the first transmitter electrode is driven for capacitive sensing by the driver module, and receiving second resulting signals with the receiver electrodes when the second transmitter electrode is driven for capacitive sensing by the driver module. The processing system further includes a determination module configured for determining positional information based on the first and second resulting signals.

Embodiments of the present invention may also provide a display device integrated with a capacitive sensing device. The display device includes a plurality of common electrodes. The display device further includes a first transmitter electrode including a first set of common electrodes of the plurality of common electrodes. The display device further includes a second transmitter electrode including a second set of common electrodes of the plurality of common electrodes. A first common electrode of the second transmitter electrode is interleaved between a first pair of common electrodes of the first transmitter electrode. The display device further includes a plurality of receiver electrodes positioned substantially orthogonal to the plurality of common electrodes. The display device further includes a processing system coupled to the plurality of common electrodes and the plurality of receiver electrodes. The processing system is configured to drive the plurality of common electrodes for display updating and capacitive sensing. The processing system is further configured to receive first resulting signals with the receiver electrodes when the first transmitter electrode is driven for capacitive sensing, and receive second resulting signals with the receiver electrodes when the second transmitter electrode is driven for capacitive sensing. The processing system is further configured to determine positional information based on the first and second resulting signals.

Embodiments of the present invention may also provide a method of capacitive sensing with a display device integrated with a capacitive sensing device having a plurality of common electrodes, a first transmitter electrode including a first set of common electrodes of the plurality of common electrodes, a second transmitter electrode including a second set of common electrodes of the plurality of common electrodes, a plurality of receiver electrodes, a driver module coupled to the plurality of common electrodes, a receiver module coupled to the plurality of receiver electrodes, and a determination module. A first common electrode of the second transmitter electrode is interleaved between a first pair of common electrodes of the first transmitter electrode. The method includes driving the first and second transmitter electrodes for display updating and capacitive sensing with the driver module, receiving first resulting signals from the receiver electrodes with the receiver module when the first transmitter electrode is driven for capacitive sensing, receiving second resulting signals from the receiver electrodes with the receiver module when the second transmitter electrode is driven for capacitive sensing, and determining positional information with the determination module based on the first and second resulting signals.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for spatially interleaving adjacent transmitter electrodes to achieve spatial spreading or smoothing of input sensing. In turn, spatial spreading of input sensing allows for the use of positional algorithms that improve the accuracy of input sensing. Further, interleaving permits the number of common electrodes allocated to each transmitter electrode to be decreased, decreasing RC settling time and, consequently, enabling additional samples to be acquired for each capacitive frame.

Figure 1:
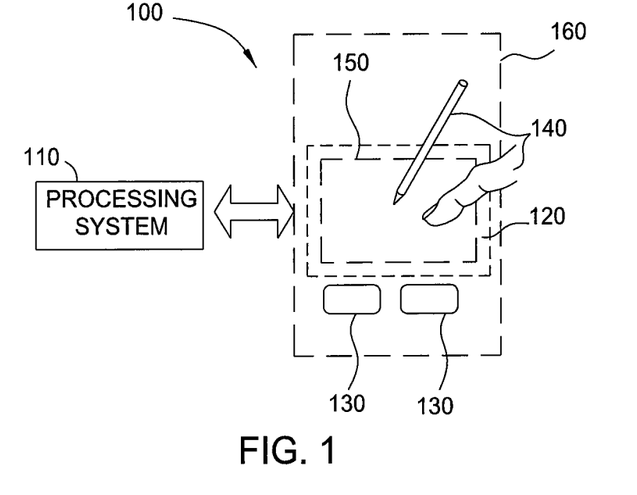
FIG. 1 is an input device including a display device having an integrated sensing device.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and or parallel connections). Examples include $I^2C$, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The facesheet (e.g., LCD Lens) may provide a useful contact surface for an input object.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastic, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically readable instructions, such as firmware code, software code, and/or the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
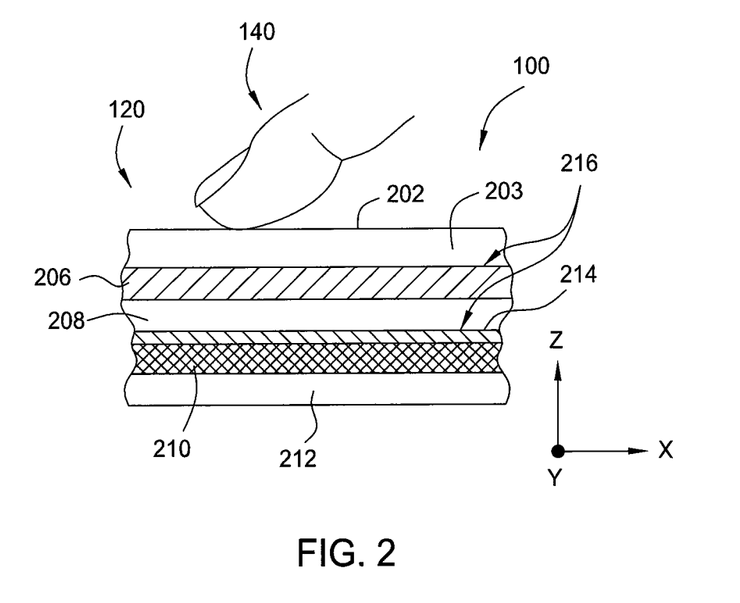
FIG. 2 is a partial schematic cross-sectional view of an embodiment of input device of FIG. 1.

FIG. 2 is a partial schematic cross-sectional view of an embodiment of input device 100 of FIG. 1. In such an embodiment, the input device 100 comprises a display device with an integrated sensor device and includes an input surface 202 provided by a first substrate 203 disposed between the input object 140 and the sensing elements of the sensor assembly. The first substrate 203 may be a lens or window comprising glass, plastic, or any other substantially transparent material. The sensing elements 150 include sensor electrodes 216, including a first plurality of sensor electrodes 214 and a second plurality of sensor electrodes 206 for sensing the input object 140. In one embodiment, the first plurality of sensor electrodes 214 are configured as transmitter electrodes while the second plurality of sensor electrodes 206 are configured as receiver electrodes. A second substrate 208 may be a color filter glass.

The input device 100 may further include a display element layer 210 and a third substrate 212. In one embodiment the third substrate 212 is an active layer which includes the switching and driving circuitry of the display device. For example, the third substrate may be a thin-film transistor (TFT) layer or the like. In various embodiments, the display element layer 210 may include a layer containing field-effect display materials, such as liquid crystal (LC), organic light emitting diodes (OLED), or other display materials.

In one embodiment, the second plurality of sensor electrodes 206 may be disposed between the first plurality of sensor electrodes 214 and the input surface 202. In various embodiments, the second plurality of sensor electrodes 206 may be disposed the first substrate 203 or second substrate 208. In other embodiments, the second plurality of sensor electrodes 206 may be disposed on a substrate (not shown) disposed between the input surface 202 and second substrate 208, such as a polarizer film, an anti-shatter film, and the like. The first plurality of sensor electrodes 214 may be used both for sensing positional information of the input object 140 and for updating the display device. In various embodiments, the second plurality of sensor electrodes 214 may be disposed on the third substrate 212 or the second substrate 208 such that they are insulated from the second plurality of sensor electrodes 206. While not shown, in yet another embodiment, the first plurality of sensor electrodes 214 and the second plurality of sensor electrodes 206 may be disposed on the same layer of a substrate. For example, the first plurality of sensor electrodes 214 and the second plurality of sensor electrodes 206 may be disposed on the same side of second substrate 208 or on the same side of third substrate 212. In further embodiments, the input device 100 may include additional layers not shown, and at least a portion of the first plurality of sensor electrodes 214 and/or the second plurality of sensor electrodes 206 may be disposed on one or more of the additional layers.

Figure 3:
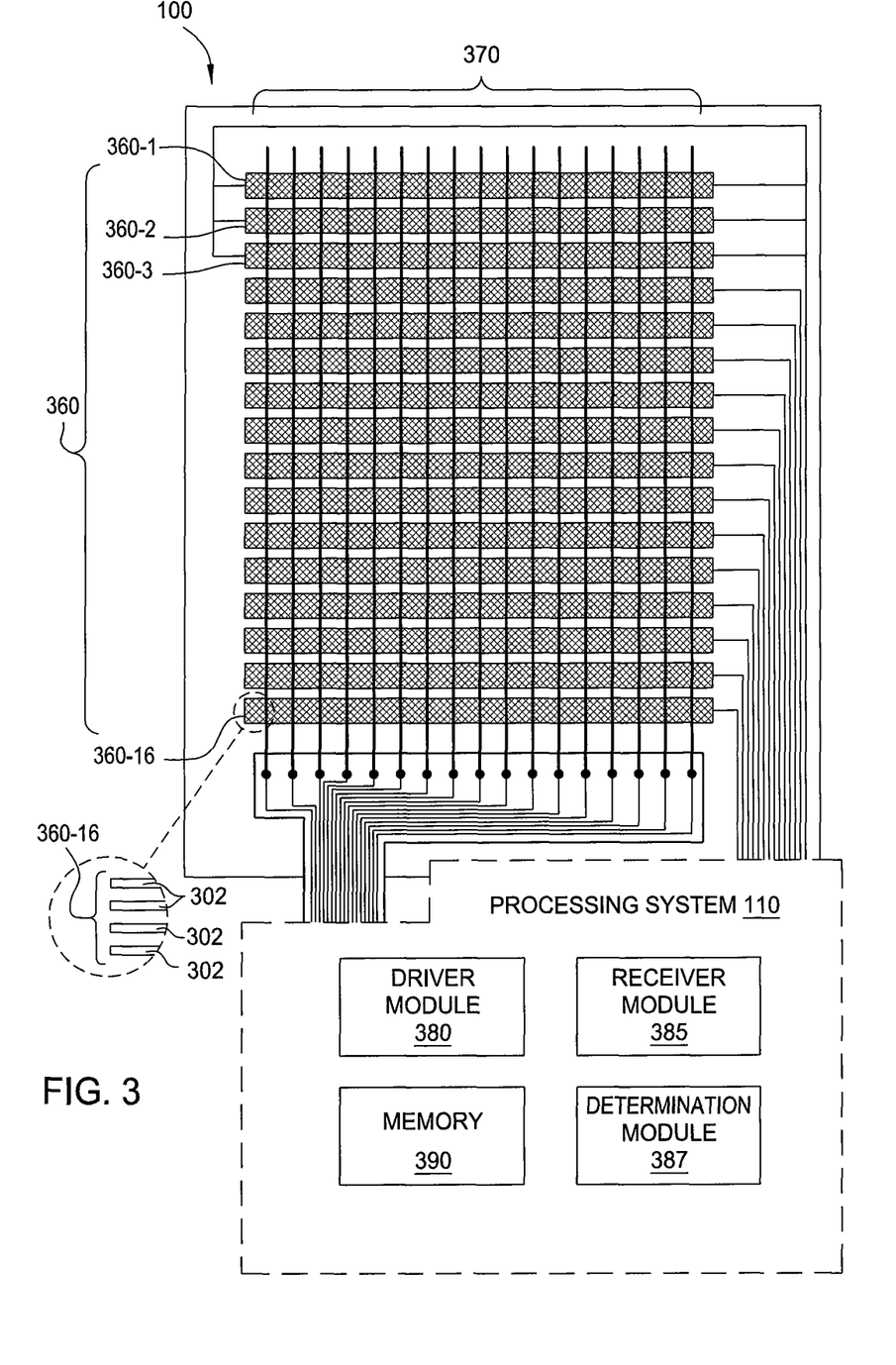
FIG. 3 is a partial schematic plan view of an embodiment of the input device of FIG. 1.

FIG. 3 is a partial schematic plan view of an embodiment of the input device 100 of FIG. 1. The input device 100 includes a plurality of sensor electrodes 216 (transmitter electrodes 360 and receiver electrodes 370) and a processing system 110. In one embodiment, processing system 110 comprises a single integrated circuit. In other embodiments, processing system 110 comprises at least two separate integrated circuits and a synchronization mechanism configured to synchronize the multiple processing systems with each other. The plurality of sensor electrodes 216 include a plurality of M transmitter electrodes 360 (e.g., transmitter electrodes 360-1, 360-2, 360-3, etc.) and a plurality of receiver electrodes 370 (e.g., receiver electrodes 370-1, 370-2, 370-3, etc.). Each transmitter electrode 360 includes K common electrodes 302. The common electrodes 302 are individually driven to update the display device 160 while the transmitter electrodes 360 are driven to provide a signal utilized for capacitive sensing by the input device 100. The number of common electrodes 302 driven for a single capacitive frame ("N") is equal to the number of transmitter electrodes 360 ("M") multiplied by the number of common electrodes 302 included in each transmitter electrode ("K").

Although specific values for K, M, and N are described with respect to the exemplary embodiments illustrated in FIGS. 3-6, it is contemplated that any number of common electrodes 302 may be used to form each transmitter electrode 360. Further, any number M of transmitter electrodes 360 and any number N of common electrodes 302 (e.g., N≈4096, 8192, and greater) may be driven to acquire a single capacitive frame.

In various embodiments, a transmitter electrode may comprise one or more common electrodes. Processing system 110 may comprise a driver module 380, a receiver module 385, a determination module 387, and an optional memory 390. In embodiments in which the processing system 110 comprises multiple integrated circuits, the drive module 380, receiver module 385 and/or the determination module 387 may reside entirely within one of the multiple processing systems or within more than one of the processing systems. Further, transmitter electrodes 360 and receiver electrodes 370 may be coupled with one of the multiple processing systems or with more than one of the processing systems. In one embodiment, the transmitter electrodes 360 (and corresponding common electrodes) may be directly driven or indirectly driven through selection transistors (e.g., TFT). In various embodiments, the transmitter electrode may be selected by driver module 380.

The processing system 110 is coupled with a plurality of common electrodes 302, which may be configured to operate as transmitter electrodes 360 for capacitive sensing, such as by driving the common electrodes with the driver module 380. The processing system 110 is further coupled with receiver electrodes 370 and configured to receive resulting signals with receiver electrodes 370. The driver module 380 may be configured for updating images on the display screen of the display device by sequentially driving individual common electrodes 302. In one embodiment, the common electrodes may comprise the pixel source electrodes of the display screen. The driver module 380 also may be configured to apply one or more common drive voltage(s) to the common electrodes 302 through the driver module 380 to operate the common electrodes to update the display screen. In some embodiments (e.g., line inversion embodiments), the driver module 380 is also configured to invert the common drive voltage in synchronization with a drive cycle of the image display.

As mentioned above, processing system 110 illustrated in FIG. 3 may comprise a single integrated circuit or multiple integrated circuits to control the various components in the input device. For example, the functions of the processing system 110 may be implemented in one integrated circuit that can control the display device elements, drive transmitter signals with the sensor electrodes 216, and/or receive resulting signals with the sensor electrodes 216, the sensor electrodes 216 including the receiver electrodes 370 and transmitter electrodes 360. In embodiments having more than one integrated circuit, communicating between separate integrated circuits may be achieved via a synchronization mechanism.

In some touch screen embodiments, the transmitter electrodes 360 and/or the receiver electrodes 370 are disposed on a substrate of the associated display device. For example, the transmitter electrodes 360 and/or the receiver electrodes 370 may be disposed on a polarizer, a color filter substrate (reference numeral 208 in FIG. 2), or a lens and/or window of a display device. As a specific example, the transmitter electrodes 360 may be disposed on an active layer substrate (reference numeral 212 in FIG. 2) of a display device and may be used in display operations of the display screen. As another example, the receiver electrodes 370 may be disposed on a color filter substrate (reference numeral 208 in FIG. 2), on a polarizer film, on a protective material (e.g., an anti-shatter, anti-static film or the like) disposed on the display device, on a lens or window (reference numeral 203 in FIG. 2), and the like.

Transmitter electrodes 360 and receiver electrodes 370 are ohmically isolated from each other. That is, one or more insulators separate transmitter electrodes 360 and receiver electrodes 370 and prevent them from electrically shorting to each other. In one embodiment, an electrically insulative material separates the transmitter electrodes 360 and the receiver electrodes 370 at cross-over areas at which the electrodes intersect. In such configurations, the transmitter electrodes 360 and/or receiver electrodes 370 may be formed with jumpers connecting different portions of the same electrode. In some embodiments, transmitter electrodes 360 and receiver electrodes 370 are separated by one or more layers of electrically insulative material and/or by one or more substrates. For example, the transmitter electrodes 360 and receiver electrodes 370 may be disposed on opposite sides of the same substrate (e.g., color filter glass), or the electrodes may be disposed on different substrates and/or layers of the input device 100. In yet other embodiments, the transmitter electrodes 360 and receiver electrodes 370 are disposed in a similar layer on the same side of a substrate. In such a configuration, an insulative material may be patterned between the transmitter electrodes 360 and receiver electrodes 370, or the sensor electrodes may be patterned such that they are isolated from each other.

The areas of localized capacitive coupling between transmitter electrodes 360 and receiver electrodes 370 may be termed "capacitive pixels." The capacitive coupling between the transmitter electrodes 360 and receiver electrodes 370 changes with the proximity and motion of input objects in the sensing region 120 associated with the transmitter electrodes 360 and receiver electrodes 370.

In some embodiments, the sensor pattern is "scanned" to determine these capacitive couplings. That is, the transmitter electrodes 360 are driven to transmit transmitter signals. The input device 100 may be operated such that one transmitter electrode transmits at one time, or multiple transmitter electrodes transmit at the same time. Where multiple transmitter electrodes transmit simultaneously, these multiple transmitter electrodes may transmit the same transmitter signal to effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 370 to be independently determined.

The receiver sensor electrodes 370 may be operated singly or multiply to acquire resulting signals. The resulting signals may be used to determine measurements of the capacitive couplings at the capacitive pixels. Such measurements are then used to determine whether an input object is present and, if an input object is present, its positional information, as discussed above. In various embodiments, where each transmitter electrode comprises one or more common electrodes, driving common electrodes for capacitive sensing may comprise any of the above methods.

A set of measurements from the capacitive pixels form a "capacitive image" (also "capacitive frame") representative of the capacitive couplings at the pixels. For a single capacitive frame, M transmitter electrodes 360 are driven for input sensing. For example, in FIG. 3, 16 transmitter electrodes 360 are driven to acquire a single capacitive frame (M=16). However, in other embodiments, any number of transmitter electrodes 360 may form a single capacitive frame. Multiple capacitive images may be acquired over multiple time periods and differences between them used to derive information about input in the sensing region. For example, successive capacitive images acquired over successive periods of time can be used to track the motion(s) of one or more input objects entering, exiting, and within the sensing region (e.g., the area of the frame).

In various embodiments, the baseline capacitance of a sensor device is the capacitive image associated with no input object is determined to be in the sensing region. The baseline capacitance changes with the environment and operating conditions, and may be estimated in various ways. For example, some embodiments take "baseline images" when it is determined that there is no input object in the sensing region and use those baseline images as estimates of their baseline capacitances.

Capacitive images can be adjusted for the baseline capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels and determine changes from that baseline image. In various embodiments, "baselining" measurements depends upon the measured interference.

In some touch screen embodiments, the common electrodes 302 comprising the transmitter electrodes 360 also are used in updating the display of the screen as described above and also may be referred to as common electrodes (e.g., segments of a segmented V-com electrode or source driver electrodes). These common electrodes (e.g., reference numerals 360-1, 360-2, 360-3, . . . 360-16 shown in FIG. 3) may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode," since it performs multiple functions.

In various touch screen embodiments, the "capacitive frame rate" or "report rate" (the rate at which full successive capacitive images are acquired) may be the same or may be different than the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the baseline capacitive image. Thus, if a first capacitive image is acquired when the display updating is at a first state (e.g., beginning of updating a display frame), and a second capacitive image is acquired when the display updating is at a second state (e.g., a fraction of the way through updating a display frame), the first and second capacitive images may differ due to differences in the baseline capacitive image associated with the display updating states, and not due to changes in the sensing region. Further, the interference measurements may also be affected by different display updating states. This is more likely where the capacitive sensing and display updating electrodes are in close proximity to each other, or when they are shared (e.g., common electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a third display updating state (e.g., one half of the way through updating a display frame) is considered to be of a third frame type, and so on. Where the relationship of display update state and capacitive image acquisition is periodic, acquired capacitive images may repeatedly cycle through the frame types. Similarly, interference measurements of different types may be taken during different updating states.

Virtual Geometries for In-Cell Touch Sensors

Figure 4:
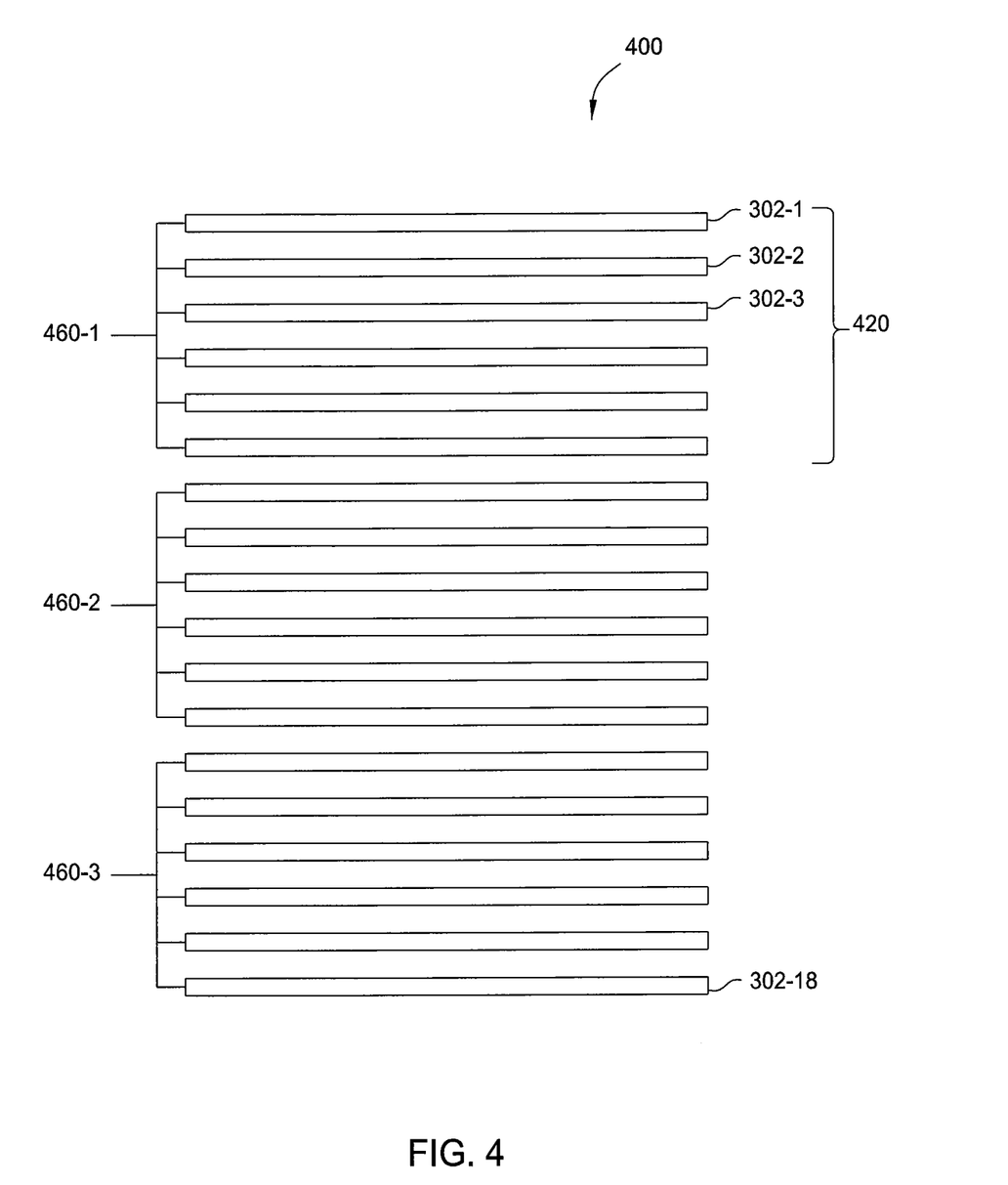
FIG. 4 is a partial schematic view of a plurality of transmitter electrodes in a conventional configuration.

FIG. 4 is a partial schematic view of a plurality of transmitter electrodes 460 in a conventional configuration of a conventional input device 400. The other elements of the input device 400 may be similar to the input device 100 described above. Although any number of transmitter electrodes 460 may be driven to acquire each capacitive frame (e.g., M=16), only exemplary transmitter electrodes 460-1, 460-2, and 460-3 are illustrated in FIG. 4.

Each of the M transmitter electrodes 460 includes K common electrodes 302. In the configuration illustrated in FIG. 4, each transmitter electrode 460 includes six common electrodes 302 (K=6). As a result, in the input device 400 illustrated in FIG. 4, if the number of transmitter electrodes 460 driven to acquire each capacitive frame is (M=16), then the total number N of common electrodes 302 driven for a single capacitive frame is 96 (N=96).

As shown in FIG. 4, a first transmitter electrode 460-1 is defined by common electrodes 302-1 through 302-6, a second transmitter electrode 460-2 is defined by common electrodes 302-7 through 302-12, and a third transmitter electrode 460-3 is defined by common electrodes 302-13 through 302-18. During a display update time period, a driver module 380 may update images on the display screen by applying one or more voltages to each of the common electrodes 302 in a separate and distinct manner. For example, a first voltage may be applied to common electrode 302-1, a second voltage may be applied to common electrode 302-2, and so on, until each of the common electrodes 302 has been driven an appropriate number of times for display updating. However, during a non-display time period, the driver module may drive each grouping of common electrodes 302 in a collective manner. That is, common electrodes 302-1 through 302-6 (i.e., transmitter electrode 460-1) may be driven with a first transmitter signal, common electrodes 302-7 through 302-12 (i.e., transmitter electrode 460-2) may be driven with a second transmitter signal, and common electrodes 302-13 through 302-18 (i.e., transmitter electrode 460-3) may be driven with a third transmitter signal. Additionally, each transmitter electrode 460 may be driven one or more times for each capacitive frame.

In various embodiments, the number of times that each transmitter electrode 460 may be driven for input sensing during a single capacitive frame is limited by the length of the non-display time periods allocated to performing input sensing. In various embodiments, the number of times that each transmitter electrode 460 may be driven for input sensing during a single capacitive frame may be further limited by the number of transmitter electrodes 460 scanned during each capacitive frame. For example, if the common electrodes 302 illustrated in FIG. 4 were instead divided into six transmitter electrodes 460 (e.g., with each transmitter electrode including three common electrodes 302) in order to increase the resolution of input sensing, each transmitter electrode 460 could be driven fewer times during a single capacitive frame. Consequently, in conventional configurations, the pitch size 420 and resolution of the transmitter electrodes 460 may be limited by the length of the non-display time periods allocated to performing input sensing—if the pitch size 420 is decreased, the number of times that each transmitter electrode 460 may be driven for input sensing during a single capacitive frame may decrease, resulting in increased interference susceptibility. Moreover, in conventional configurations, the use of positioning algorithms sets an upper limit on pitch size 420, above which positioning accuracy significantly decreases. In cases where K is low enough to satisfy a required pitch size of about 4.5 millimeters (mm), too few data samples may be collected for each transmitter electrode 460 to achieve acceptable interference (noise) mitigation and receiver circuitry saturation.

Figure 5:
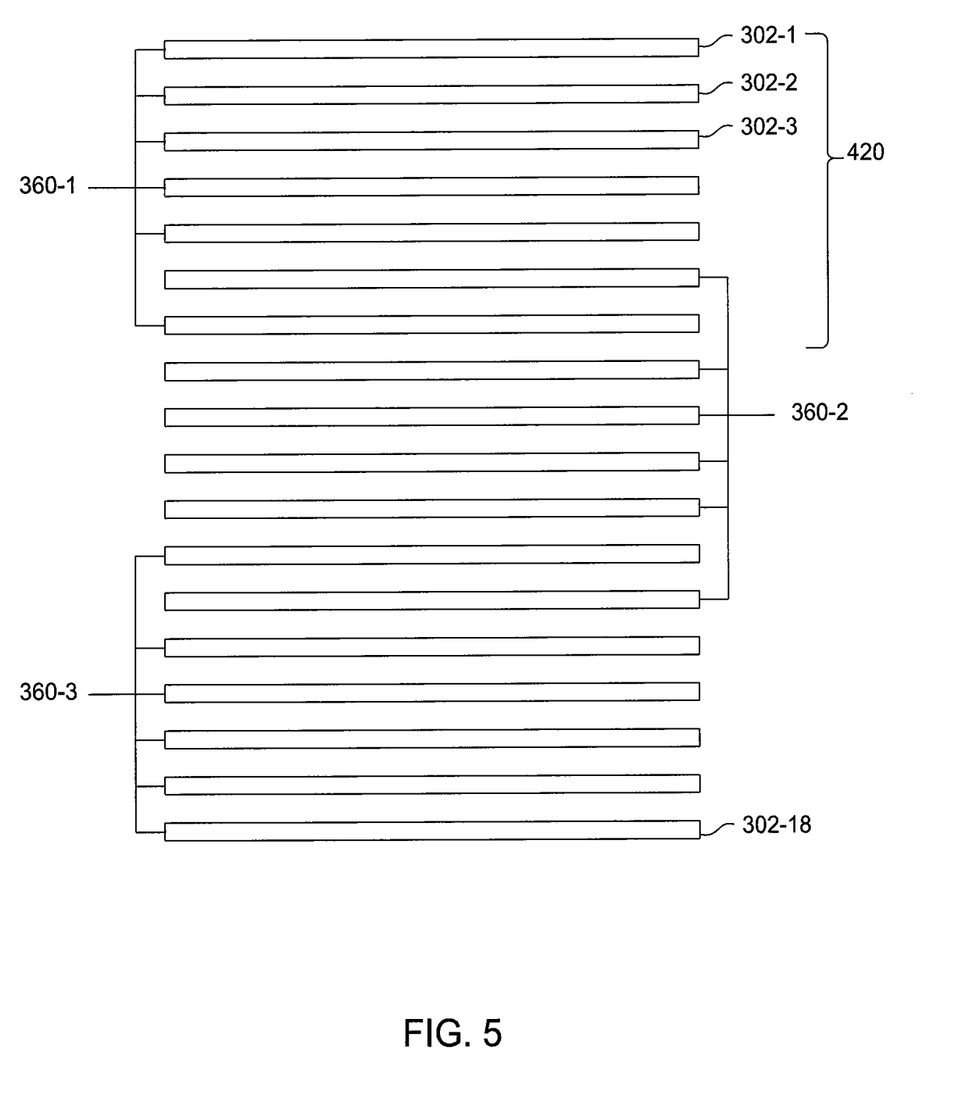
FIGS. 5 and 6 are partial schematic views of a plurality of transmitter electrodes having an interleaved configuration.
Figure 6:
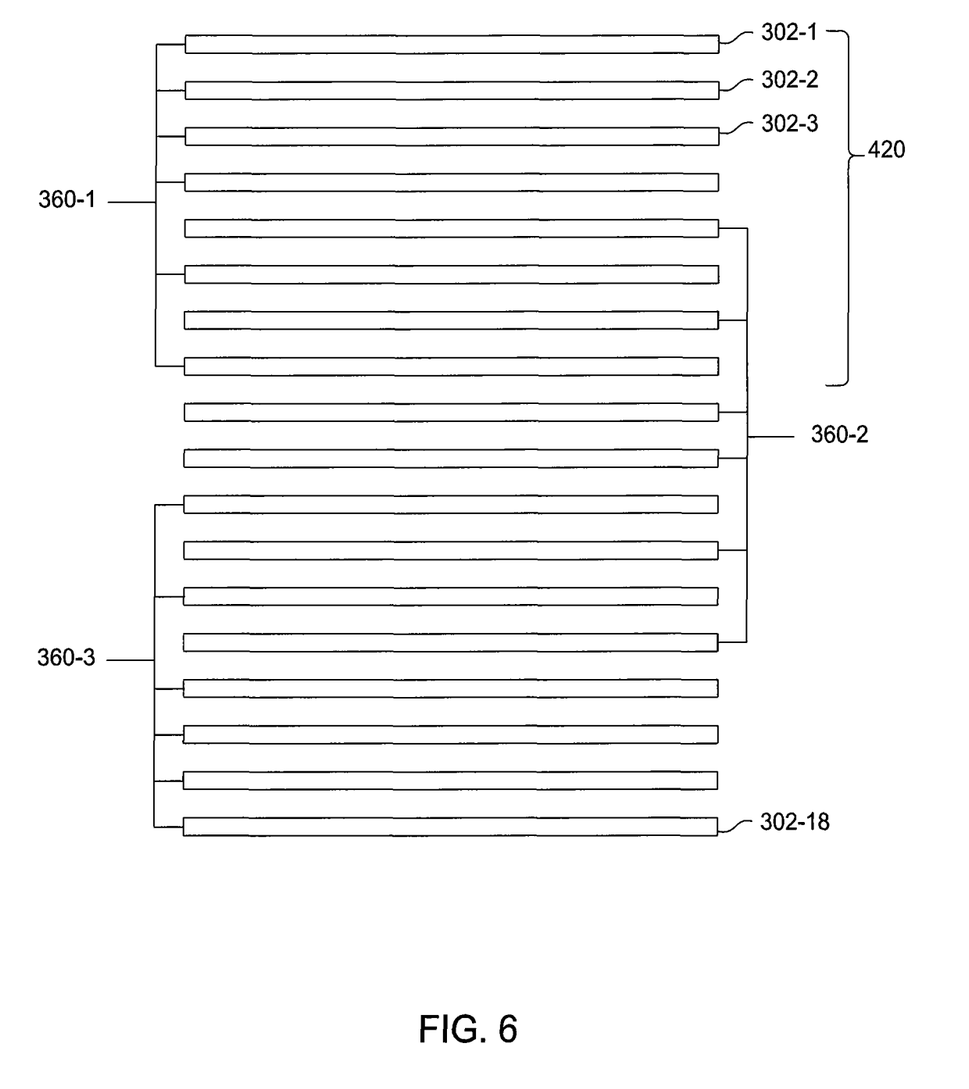

FIGS. 5 and 6 are partial schematic views of the plurality of transmitter electrodes 360 having an interleaved configuration which provides reduced interference susceptibility and increased positioning accuracy compared to the convention input device 400 illustrated in FIG. 4. For discussion, each transmitter electrode 360 includes six common electrodes 302 (K=6). As discussed above, the number of common electrodes 302 included in a transmitter electrode 360 may be more or less than the six common electrodes 302 illustrated in FIGS. 5 and 6.

As shown in FIG. 5, a first transmitter electrode 360-1 is defined by common electrodes 302-1 through 302-5 and 302-7, a second transmitter electrode 360-2 is defined by common electrodes 302-6, 302-8 through 302-11, and 302-13, and a third transmitter electrode 360-3 is defined by common electrodes 302-12 and 302-14 through 302-18. Accordingly, by alternating the transmitter electrodes 360 with which sequential common electrodes 302 are associated, the configuration shown in FIG. 5 achieves spatial interleaving of the common electrodes 302 of each transmitter electrode 360.

The degree to which common electrodes 302 are interleaved may be quantified by an interleaving parameter L, which denotes the number of common electrodes 302 of each transmitter electrode 360 that are interleaved with the common electrodes 302 of each adjacent transmitter electrode 360. Thus, in the configuration shown in FIG. 5, L is equal to 1, since each transmitter electrode 360 has 1 common electrode 302 interleaved with each adjacent transmitter electrode 360. Moreover, the interleaving parameter L may be a fractional, non-integer value. In one such example, one common electrode 302 of transmitter electrode 360-1 may be interleaved with the common electrodes 302 of transmitter electrode 360-2, and two adjacent common electrodes 302 of transmitter electrode 360-2 may be interleaved with the common electrodes 302 of transmitter electrode 360-1. In such an example, the interleaving parameter L is equal to 1.5. In other embodiments, at least two common electrodes of transmitter electrode 360-2 may be interleaved between two common electrodes of transmitter electrode 360-1. In various other embodiments, one or more electrically floated common electrodes and/or one or more common electrodes driven with a substantially common voltage may be disposed between or interdigitated with transmitter electrodes 360.

As shown in FIG. 6, a first transmitter electrode 360-1 is defined by common electrodes 302-1 through 302-4, 302-6, and 302-8, a second transmitter electrode 360-2 is defined by common electrodes 302-5, 302-7, 302-9, 302-10, 302-12, and 302-14, and a third transmitter electrode 360-3 is defined by common electrodes 302-11, 302-13, and 302-15 through 302-18. Accordingly, the configuration shown in FIG. 6 has an interleaving parameter L equal to 2, since each transmitter electrode 360 has 2 common electrodes 302 interleaved with each adjacent transmitter electrode 360. The interleaving parameter L may alternatively be greater than 2. In one embodiment, at least one common electrode of transmitter electrode 360-3 is interdigitated with transmitter electrode 360-2 and at least one common electrode of transmitter electrode 360-3 is interdigitated with transmitter electrode 360-1.

By spatially interleaving adjacent transmitter electrodes 360, a spatial spreading or smoothing of input sensing is achieved such that K (the number of common electrodes 302 in each transmitter electrode 360), as well as the number of times each transmitter electrode 360 is driven for input sensing for a single capacitive frame, may be decreased without significantly degrading positioning accuracy. In contrast to overlapping the transmitter electrodes 360, in which the common electrodes 302 of adjacent transmitter electrodes 360 are allocated to and driven for input sensing with more than one transmitter electrode 360, interleaving transmitter electrodes 360 does not increase the number of common electrodes 302 allocated to each transmitter electrode 360. Consequently, RC settling time remains constant, allowing the frequency at which the transmitter electrodes 360 are driven to remain constant. Further, if interleaving and a decrease in K are performed, RC settling time may decrease, enabling the frequency at which the transmitter electrodes 360 are driven to be increased and permitting additional samples to be acquired for each capacitive frame.

For the purpose of clarity, each grouping of common electrodes 302 in FIGS. 5-6 are illustrated as being coupled via static connections to form distinct transmitter electrodes 360. However, it is contemplated that the common electrodes 302 may be allocated to transmitter electrodes 360 either statically or dynamically. For example, each common electrode 302 may be statically routed to the processing system 110, or the common electrodes 302 may be allocated to transmitter electrodes 360 with logic that is hardcoded in the processing system 110. In other embodiments, the allocation of common electrodes 302 to transmitter electrodes 460 may be modified on the fly by the processing system 110, which may dynamically assign each common electrode 302 to a particular transmitter electrode 360 depending on, for example, desired operational characteristics, device feedback, and/or in response to interference. Additionally, the interleaving parameter L may be static or may be dynamically modified during operation of the input device 100 based on, for example, the aforementioned criteria. For example, the interleaving parameter L may be dynamically varied such that, in one frame L=1, in the next frame L=2, and so on.

Figure 7A:
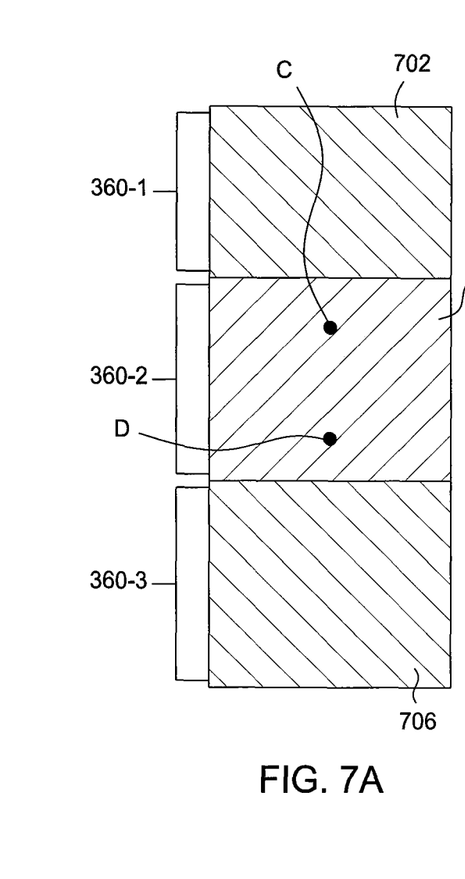
FIG. 7A illustrates input sensing regions associated with the conventional configuration of transmitter electrodes depicted in FIG. 4.

FIG. 7A illustrates the input sensing regions 702, 704, 706 in the conventional configuration of FIG. 4. As shown, the conventional configuration includes three distinct, non-overlapping input sensing regions 702, 704, 706, which correspond to the groupings of common electrodes 302 allocated to each transmitter electrode 360.

Figure 7B:
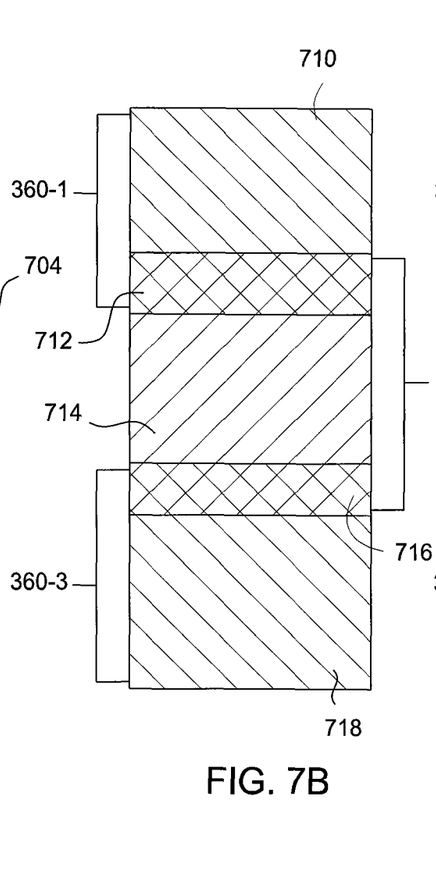
FIGS. 7B and 7C illustrate spatial spreading of input sensing regions associated with the interleaved configurations of the transmitter electrodes depicted in FIGS. 5 and 6.
Figure 7C:
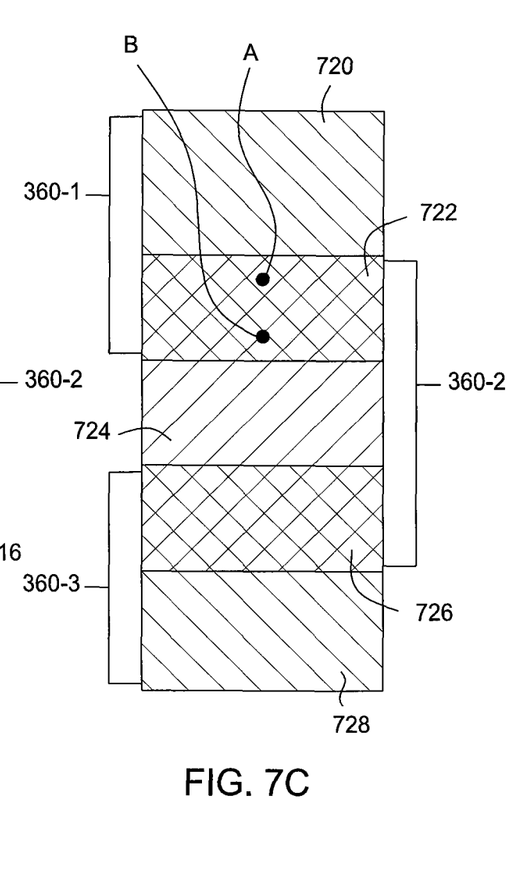

FIGS. 7B and 7C illustrate overlapping and non-overlapping input sensing regions in the interleaved configurations of FIGS. 5 and 6. As shown, interleaving the common electrodes 302 produces overlapping input sensing regions (e.g., 712, 716, 722, and 726) and non-overlapping input sensing regions (e.g., 710, 714, 718, 720, 724, and 728) and results in a spatial spreading of these input sensing regions. As a result, positional information of an input object 140 may be interpolated between one or more of the transmitter electrodes 360. For example, an input object 140 located at position A may produce a large response (e.g., a change in capacitance or transcapacitance) over the sensing region associated with transmitter electrode 360-1, and a smaller response over the sensing region associated with transmitter electrode 360-2, enabling the processing system 110 to determine that the input object 140 is located near the top edge of transmitter electrode 360-2. In another example, an input object 140 located at position B may produce a small response over the sensing region associated with transmitter electrode 360-1, and a larger response over the sensing region associated with transmitter electrode 360-2, enabling the processing system 110 to determine that the input object 140 is located near the bottom edge of transmitter electrode 360-1. In contrast, as shown in FIG. 7A, the input device 400 of FIG. 4 may be unable to distinguish between an input object 140 located at position C and an input object 140 located at position D, since, at each position, the input objects 140 may produce a similar response over the sensing region associated with transmitter electrode 360-2. Accordingly, the interleaving configurations associated with FIGS. 7B and 7C enable more accurate determination of the location of an input object 140.

A variety of positioning algorithms may be applied to determine the presence or absence of an input object 140. For example, in FIG. 7B, if resulting signals received by the processing system 110 indicate the presence of an input object 140 in the region corresponding to transmitter electrode 360-1 and the region corresponding to transmitter electrode 360-2, a positioning algorithm may determine that the input object 140 is located in region 712. Moreover, as discussed above, the magnitude of the response associated with each transmitter electrode 360-1, 360-2 may be used to more accurately determine where within the input sensing region 712 the input object 140 is located. In contrast, if the resulting signals received by the processing system 110 indicate the presence of an input object 140 in either the region corresponding to transmitter electrode 360-1 or the region corresponding to transmitter electrode 360-2, the positioning algorithm may determine that the input object 140 is located in either region 710 or region 714, respectively. Similarly, in FIG. 7C, if resulting signals received by the processing system 110 indicate the presence of an input object 140 in the region corresponding to transmitter electrode 360-1 and the region corresponding to transmitter electrode 360-2, a positioning algorithm may determine that the input object 140 is located in region 722, whereas, if the resulting signals received by the processing system 110 indicate the presence of an input object 140 in either the region corresponding to transmitter electrode 360-1 or the region corresponding to transmitter electrode 360-2, the positioning algorithm may determine that the input object 140 is located in either region 720 or region 724, respectively.

As further illustrated in FIG. 7B and 7C, the relationship between L and K affects spatial spreading characteristics. For instance, an L to K ratio of 1:6, shown in FIG. 7B, exhibits a low degree of spatial spreading. However, an L to K ratio of 1:3, shown in FIG. 7C, exhibits a higher degree of spatial spreading, such that the overlapping and non-overlapping input sensing regions 720, 722, 724, 726 and 728 are of a relatively uniform size. Moreover, having input sensing regions of a relatively uniform size may be beneficial to input sensing accuracy in applications in which positioning algorithms are used.

Figure 8:
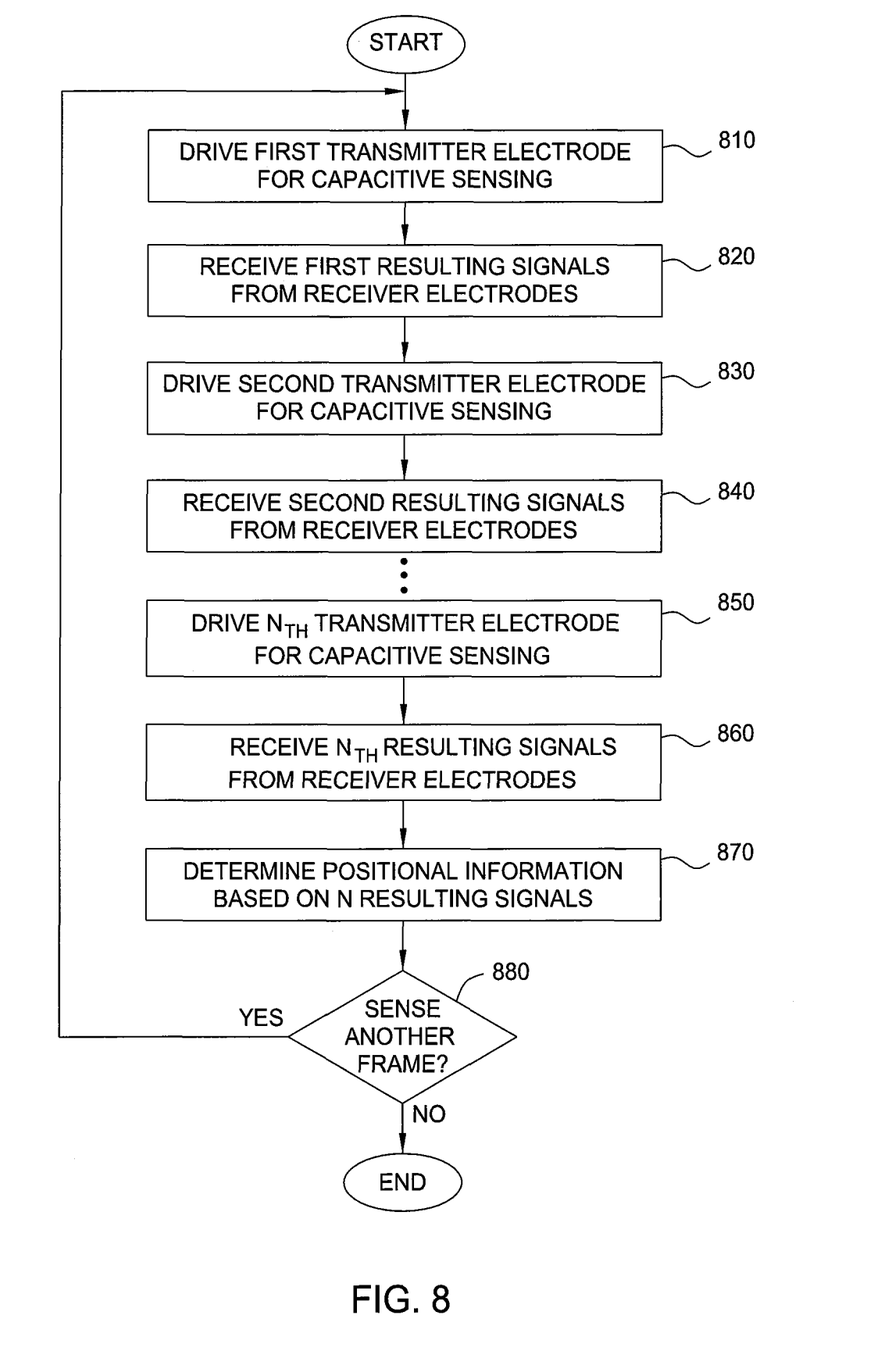
FIG. 8 is a flow diagram of method steps for performing capacitive sensing in an input device comprising a display device having an integrated capacitive sensing device according to one embodiment of the present invention.

FIG. 8 is a flow diagram of method steps for performing capacitive sensing in an input device 100 comprising a display device 160 having an integrated capacitive sensing device according to one embodiment of the present invention.

The capacitive sensing device may include a plurality of common electrodes, a first transmitter electrode, a second transmitter electrode, a plurality of receiver electrodes, a driver module coupled to the plurality of common electrodes, a receiver module coupled to the plurality of receiver electrodes, and a determination module. The first transmitter electrode includes a first set of common electrodes of the plurality of common electrodes. The second transmitter electrode includes a second set of common electrodes of the plurality of common electrodes. A first common electrode of the second transmitter electrode is interleaved between a first pair of common electrodes of the first transmitter electrode. Although the method steps are described in conjunction with FIGS. 1-3, 5 and 6, persons skilled in the art with understand that any system configured to perform the method steps, in any order, falls within the scope of the present invention.

The method begins at step 810, where a first transmitter electrode 360 is driven for capacitive sensing. At step 820, the processing system 110 receives first resulting signals from receiver electrodes 370. At step 830, a second transmitter electrode 360 is driven for capacitive sensing. At step 840, the processing system 110 receives second resulting signals from the receiver electrodes 370. At steps 850 and 860, additional transmitter electrodes 360 (up to N transmitter electrodes 360) may be driven for capacitive sensing, and the processing system 110 may receive additional resulting signals from the receiver electrodes 370. At step 870, the processing system 110 determines positional information based on the N resulting signals. Finally, at step 880, if the acquisition of another capacitive frame is desired, the method steps are repeated.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for a display device integrated with a capacitive sensing device comprising:
   a driver module comprising driving circuitry, the driver module coupled to a plurality of common electrodes, each common electrode included in the plurality of common electrodes configured to be driven for both display updating and capacitive sensing, wherein a first transmitter electrode comprises a first set of common electrodes of the plurality of common electrodes and a second transmitter electrode comprises a second set of common electrodes of the plurality of common electrodes, and wherein a first common electrode of the second transmitter electrode is interleaved between a first pair of common electrodes of the first transmitter electrode;
   a receiver module coupled to a plurality of receiver electrodes and configured for:
      receiving first resulting signals with the receiver electrodes when the first transmitter electrode is driven for capacitive sensing by the driver module; and receiving second resulting signals with the receiver electrodes when the second transmitter electrode is driven for capacitive sensing by the driver module; and a determination module configured for determining positional information based on the first and second resulting signals.

2. The processing system of claim 1, wherein the second transmitter electrode further comprises a second common electrode interleaved between a second pair of common electrodes of the first transmitter electrode.

3. The processing system of claim 1, further comprising a third transmitter electrode comprising a third set of common electrodes of the plurality of common electrodes, wherein the third transmitter electrode comprises a third common electrode interleaved between a third pair of common electrodes of the second transmitter electrodes.

4. The processing system of claim 1, wherein the first transmitter electrode is configured to be driven for capacitive sensing by the driver module during a first time period, and the second transmitter electrode is configured to be driven for capacitive sensing during a second time period, wherein the first and second time periods are non-overlapping, the second transmitter electrode is not driven for capacitive sensing by the driver module during the first time period, and the first transmitter electrode is not driven for capacitive sensing during the second time period.

5. The processing system of claim 1, wherein the first transmitter electrode and the second transmitter electrode are substantially simultaneously driven for capacitive sensing by the driver module.

6. The processing system of claim 1, wherein the first transmitter electrode is configured to be driven for capacitive sensing by the driver module during a first time period, and the second transmitter electrode is configured to be driven for capacitive sensing during a second time period, wherein the first time period corresponds to a first non-display period, and the second time period corresponds to a second non-display period.

7. A display device integrated with a capacitive sensing device comprising:
   a plurality of common electrodes;
   a first transmitter electrode comprising a first set of common electrodes of the plurality of common electrodes;
   a second transmitter electrode comprising a second set of common electrodes of the plurality of common electrodes, wherein a first common electrode of the second transmitter electrode is interleaved between a first pair of common electrodes of the first transmitter electrode;
   a plurality of receiver electrodes; and
   a processing system coupled to the plurality of common electrodes and the plurality of receiver electrodes, the processing system configured to:
      drive each common electrode included in the plurality of common electrodes for both display updating and capacitive sensing;
      receive first resulting signals with the receiver electrodes when the first transmitter electrode is driven for capacitive sensing;
      receive second resulting signals with the receiver electrodes when the second transmitter electrode is driven for capacitive sensing; and
      determine positional information based on the first and second resulting signals.

8. The display device of claim 7, wherein the second transmitter electrode further comprises a second common electrode interleaved between a second pair of common electrodes of the first transmitter electrode.

9. The display device of claim 7, further comprising a third transmitter electrode comprising a third set of common electrodes of the plurality of common electrodes, wherein the third transmitter electrode comprises a third common electrode interleaved between a third pair of common electrodes of the second transmitter electrode.

10. The display device of claim 7, wherein the first transmitter electrode is configured to be driven for capacitive sensing by the processing system during a first time period, and the second transmitter electrode is configured to be driven for capacitive sensing during a second time period, wherein the first and second time periods are non-overlapping.

11. The display device of claim 9, wherein the first transmitter electrode is configured to be driven far capacitive sensing by the processing system during a first time period, the second transmitter electrode is configured to be driven for capacitive sensing during a second time period, and the third transmitter electrode is configured to be driven for capacitive sensing during a third time period, wherein the first, second, and third time periods are non-overlapping, the second transmitter electrode is riot driven for capacitive sensing by the driver module during the first time period, and the first transmitter electrode is not driven for capacitive sensing during the second time period.

12. The display device of claim 7, wherein the first transmitter electrode is configured to he driven for capacitive sensing by the processing system during a first time period, and the second transmitter electrode is configured to be driven for capacitive sensing during a second time period, wherein the first time period corresponds to a first non-display period, and the second time period corresponds to a second non-display period.

13. A method of capacitive sensing with a display device integrated with a capacitive sensing device having a plurality of common electrodes, a first transmitter electrode comprising a first set of common electrodes of the plurality of common electrodes, a second transmitter electrode comprising a second set of common electrodes of the plurality of common electrodes, a first common electrode of the second transmitter electrode interleaved between a first pair of common electrodes of the first transmitter electrode, a plurality of receiver electrodes, a driver module coupled to the plurality of common electrodes, a receiver module coupled to the plurality of receiver electrodes, and a determination module, the method comprising:
   driving both the first transmitter electrode and the second transmitter electrode for both display updating and capacitive sensing with the driver module;
   receiving first resulting signals from the receiver electrodes with the receiver module when the first transmitter electrode is driven for capacitive sensing;
   receiving second resulting signals from the receiver electrodes with the receiver module when the second transmitter electrode is driven for capacitive sensing; and
   determining positional information with the determination module based on the first and second resulting signals.

14. The method of claim 13, wherein the second transmitter electrode further comprises a second common electrode interleaved between a second pair of common electrodes of the first transmitter electrode.

15. The method of claim 14, wherein the capacitive sensing device further comprises a third transmitter electrode comprising a third set of common electrodes of the plurality of common electrodes, and wherein the third transmitter electrode comprises a third common electrode interleaved between a third pair of common electrodes of the second transmitter electrode.

16. The method of claim 13, further comprising:
driving the first transmitter electrode with the driver module during a first time period; and
driving the second transmitter electrode with the driver module during a second time period,
wherein the first and second time periods are non-overlapping, the second transmitter electrode is not driven for capacitive sensing by the driver module during the first time period, and the first transmitter electrode is not driven for capacitive sensing during the second time period.

17. The method of claim 15, further comprising:
driving the first transmitter electrode with the driver module during a first time period;
driving the second transmitter electrode with the driver module during a second time period; and
driving the third transmitter electrode with the driver module during a third time period,
wherein the first, second, and third time periods are non-overlapping, the second transmitter electrode and third transmitter electrode are not driven for capacitive sensing by the driver module during the first time period, the first transmitter electrode and third transmitter electrode are not driven for capacitive sensing during the second time period, and the first transmitter electrode and second transmitter electrode are not driven for capacitive sensing during the third time period.

18. The method of claim 13, further comprising
driving the first transmitter electrode with the driver module during a first time period; and
driving the second transmitter electrode with the driver module during a second time period,
wherein the first time period corresponds to a first non-display period, and the second time period corresponds to a second non-display period.

19. The processing system of claim 1, wherein each common electrode included in the first set of common electrodes and the second set of common electrodes is substantially the same size.

20. The processing system of claim 19, wherein a first portion of a sensing region of the capacitive sensing device corresponds to non-interleaved electrodes included in the first set of common electrodes a second portion of the sensing region corresponds to interleaved electrodes included in the first set of common electrodes and the second set of common electrodes, a third portion of the sensing region corresponds to non-interleaved electrodes included in the second set of common electrodes, and the first portion of the sensing region, the second portion of the sensing region, and the third portion of the sensing region are substantially the same size.

* * * * *

UNITED STATES PATENT AND TRADEMARK OFFICE
CERTIFICATE OF CORRECTION

PATENT NO. : 9,075,488 B2  Page 1 of 1
APPLICATION NO. : 13/662377
DATED : July 7, 2015
INVENTOR(S) : Petr Shepelev It is certified that error appears in the above-identified patent and that said Letters Patent is hereby corrected as shown below:

Claims

Col. 17, Claim 3, line 16: delete "electrodes" and insert -- electrode -- therefor;

Col. 18, Claim 11, line 14: delete "far" and insert -- for -- therefor;

Col. 18, Claim 11, line 21: delete "riot" and insert -- not -- therefor;

Col. 20, Claim 20, line 18: please insert -- , -- after electrodes.

Signed and Sealed this
Twenty-ninth Day of March, 2016

Michelle K. Lee
*Director of the United States Patent and Trademark Office*